US010525408B2

(12) United States Patent
Eisch et al.

(10) Patent No.: US 10,525,408 B2
(45) Date of Patent: Jan. 7, 2020

(54) PLASMA EXHAUST PURIFICATION

(71) Applicant: BRÜCKNER MASCHINENBAU GMBH & CO. KG, Siegsdorf (DE)

(72) Inventors: Josef Eisch, Teisendorf (DE); Nicole Ambrosius-Voss, München (DE); Rainer Schwuchow, Nußdorf (DE); Stefan Seibel, Bad Reichenhall (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 236 days.

(21) Appl. No.: 15/524,779

(22) PCT Filed: Oct. 1, 2015

(86) PCT No.: PCT/EP2015/001939
§ 371 (c)(1),
(2) Date: May 5, 2017

(87) PCT Pub. No.: WO2016/070950
PCT Pub. Date: May 12, 2016

(65) Prior Publication Data
US 2017/0320010 A1     Nov. 9, 2017

(30) Foreign Application Priority Data

Nov. 6, 2014    (DE) .................. 10 2014 016 380

(51) Int. Cl.
  *B01D 53/54*    (2006.01)
  *B29B 7/84*    (2006.01)
  (Continued)

(52) U.S. Cl.
  CPC ........... *B01D 53/54* (2013.01); *B01D 53/323* (2013.01); *B01D 53/944* (2013.01); *B29B 7/847* (2013.01);
  (Continued)

(58) Field of Classification Search
  CPC .... B01D 53/54; B01D 53/944; B01D 53/323; B01D 2259/818; B29C 48/767;
  (Continued)

(56) References Cited

U.S. PATENT DOCUMENTS 6,007,681 A    12/1999 Kawamura et al.
2005/0139593 A1    6/2005 Bayer et al.
(Continued)

FOREIGN PATENT DOCUMENTS

DE    44 24 779    1/1996
DE    10 2007 056 610    5/2009
(Continued)

OTHER PUBLICATIONS

International Preliminary Report on Patentability issued in PCT/EP2015/001939 dated May 9, 2017.
(Continued)

*Primary Examiner* — Xiuyu Tai
(74) *Attorney, Agent, or Firm* — Nixon & Vanderhye P.C.

(57) ABSTRACT

The invention relates to an improved method and to an improved device for degassing polymer melts and for neutralizing the thus produced pollutants, characterised by the following characteristics: said pollutants are guided to a plasma source after removal from the degassing area and prior to adding to a filter step or a separator, said plasma source being built and/or formed such that in said plasma source, the pollutants are transformed, entirely or partially, in a plasma aggregate state.

18 Claims, 7 Drawing Sheets

(51) Int. Cl.
  *B01D 53/32* (2006.01)
  *B01D 53/94* (2006.01)
  *F01N 3/027* (2006.01)

(52) U.S. Cl.
  CPC ...... *F01N 3/0275* (2013.01); *B01D 2259/818* (2013.01); *F01N 2240/28* (2013.01)

(58) Field of Classification Search
  CPC .................. B29C 48/92; B29C 48/145; B29C 2948/92723; B29C 2948/00; B29C 48/40; B29C 48/92723; B29B 7/84; B29B 7/847; B29B 7/86; B29B 13/00; B29B 7/0275; B29B 2013/005; F01N 3/0275; F01N 2240/28; B09B 3/0025; B09B 3/0083; F23G 2205/18; F23G 2204/201; F23G 2209/20; F23G 2203/70; F23G 2201/80; F23G 5/448; F23G 5/10; F23G 5/085; F23G 5/033; F23M 5/08; F23M 2900/05001; F23M 2900/05004
  See application file for complete search history.

(56) References Cited

U.S. PATENT DOCUMENTS

| | | | |
|---|---|---|---|
| 2005/0212441 A1 | 9/2005 | Yamaguchi et al. | |
| 2008/0207868 A1 | 8/2008 | Kimura et al. | |
| 2009/0146349 A1 | 6/2009 | Kidokoro et al. | |
| 2010/0034917 A1* | 2/2010 | Schulz | B29C 48/2564 425/377 |
| 2010/0313797 A1* | 12/2010 | Carabin | B09B 3/0025 110/235 |
| 2013/0284588 A1 | 10/2013 | Malik et al. | |
| 2014/0209573 A1* | 7/2014 | Foret | H05H 1/26 219/121.5 |
| 2015/0343672 A1 | 12/2015 | Rabiser et al. | |

FOREIGN PATENT DOCUMENTS

| | | |
|---|---|---|
| DE | 10 2008 031 834 | 1/2010 |
| DE | 10 2011 082 769 | 3/2013 |
| DE | 10 2013 000 316 | 7/2014 |
| EP | 2 439 044 | 4/2012 |
| EP | 2 209 604 | 2/2014 |
| GB | 2 410 919 | 8/2005 |
| JP | 2000-133494 | 5/2000 |
| WO | WO 03/047727 | 6/2003 |
| WO | WO 2005/007728 | 1/2005 |
| WO | WO 2006/079299 | 8/2006 |
| WO | WO 2009/065384 | 5/2009 |

OTHER PUBLICATIONS

International Search Report for PCT/EP2015/001939, dated Jan. 7, 2016, 3 pages.

* cited by examiner

PLASMA EXHAUST PURIFICATION

This application is the U.S. national phase of International Application No. PCT/EP2015/001939 filed 1 Oct. 2015, which designated the U.S. and claims priority to DE Patent Application No. 10 2014 016 380.6 filed 6 Nov. 2014, the entire contents of each of which are hereby incorporated by reference.

The present invention relates to a method and to a device for degassing polymer melts and for neutralising the waste gases formed thereby.

In the production of products from polymers, extruders are frequently used to melt plastics granules and where corresponding properties of the finished plastics product are required to add one or more liquid or solid additives (for example plasticisers, lubricants, antistatics, etc.) and to feed the mixture to an extrusion die. The temperatures of the melt are in this case in the range between 200° C. and 300° C.

After melting, the polymer melt so formed has in its interior gaseous inclusions and liquid substances in solution, which would impair the quality of the finished product if the melt were to be processed in this form. Inclusions would have a very adverse effect in the production of plastics films. In the plasticising unit, therefore, melting of the plastics material and mixing with the additive/s is usually followed by a degassing process in one or more vacuum zones, before the melt is discharged via a discharge unit.

For this purpose, a vacuum system which is connected to the degassing zones (vacuum zone) is used. In the vacuum system, a vacuum pumping unit generates a low pressure which is able to act, through corresponding pipelines, on the vacuum zone and thus effects the removal of interfering gases, polymer degradation products and additives and impurities from the melt.

It is a further aim of the degassing to remove water (in the form of water vapour) and uncrosslinked plastics molecules (residual monomers) from the melt.

These gaseous and in some cases also liquid constituents which are removed from the plasticising unit by low pressure damage the vacuum unit in the long term, so that the service life and availability of various components is shortened considerably. The outlay in terms of cleaning and maintenance increases considerably, and occasional machine breakdowns are inevitable. Finally, problems arise with the disposal of these substances and machine components.

The reason for the damage to and contamination of the vacuum unit and the components connected thereto, such as, for example, the pipes, valves and sensors, is that the separated substances react with one another and are deposited, for thermodynamic reasons, on the surfaces.

In order to achieve the best possible quality of the products produced from the plastics melt, they must have only low moisture contents. In addition, volatile decomposition products of the plastics material, for example oligomers or undesirable additive constituents, must be kept away from the end product. The aim is, therefore, to withdraw water vapour, hydrocarbons and other sublimable constituents from the melt in the extruder region. These accompanying substances, as well as leaked air and water vapour, require a vacuum generation which is not impaired thereby. Current systems rely on equipment which conveys the accompanying substances concomitantly or on separating systems which operate in vacuo.

The systems used for this purpose in the prior art consist substantially of a melt trap, a separating device or gas purification device, and a vacuum device.

The following methods are used in separating devices or gas purification devices according to the prior art:

1) Condensation

Condensable impurities, for example oligomers, are removed from a mixture of water vapour, hydrocarbons and air by condensation.

When dry-running vacuum pumps such as, for example, Roots pumps, screw pumps, claw pumps or the like or combinations thereof are used, an in vacuo separation is employed. Methods based on condensers/sublimators (cold traps), usually in conjunction with particle filters, are conventional.

Because of the vapour pressure curve of water, complete removal by condensation is not possible. At very low pressures, there is the possibility that ice can be separated (resublime) only below the freezing point. Because other adhesions and ice can also form on the cold traps, cleaning devices for the cold surfaces are also conventional here. Alternating operation of redundant systems is also conceivable here (freezing, thawing).

Because continuous operation is to be ensured, a redundant system is usually used. This allows one separation line to be cleaned while the other is in production, see EP 2 209 604 and DE 10 2013 000 316.

2) Scrubbers

Scrubbers are also used. In this case, the gases from the extruder are brought into contact over a large area with a washing liquid. Such devices are also used to absorb gaseous impurities from such a gas mixture in a washing liquid or to filter out solid constituents of such withdrawn gas mixtures and/or to dissolve them in a washing liquid.

This washing liquid is to absorb or adsorb substances contained in the gas so that they can be removed (continuously/discontinuously) from the vacuum system with the liquid. With a skilful choice of washing liquid, the water vapour content in the gas stream can also be reduced (hygroscopic liquid). In the case of the device known from DE 10 2011 082 769, glycol, for example, is used as the hygroscopic washing liquid in combination with a regeneration system.

A further gas purification system using a washing liquid (but without a vacuum device) is disclosed, for example, in US 2008/0207868 A1. Ethylene glycol is used as the washing liquid.

A gas purification device having an integrated filter and a condenser is disclosed in DE 10 2008 031 834 A1.

According to DE 44 24 779 A1, it is proposed in particular to extract plasticiser oil from the vacuum that is present. The gas to be condensed coming from the extrusion process is guided via a pipeline to a solids separator in which coarse impurities and residual monomers (oligomers) are separated off. Constituents of the gas that are in vapour form are condensed in a condensate separator and then collected in a condensate collecting vessel. Valves are provided at the appropriate points, which valves are optionally controlled automatically in order to ensure correct operation.

In WO 2009/065384 A2, it is proposed inter alia to cool the gas mixture to temperatures below 10° C. in the degassing device and to resublime sublimable gases on a cooled, horizontal plate, from where the gases are released. From a thermodynamic point of view, this prior publication describes a procedure in which a solid immediately changes into gas and resublimes as a solid on the cooling plate by cooling. According to this prior publication, the resublimation can take place both in a sublimator in the form of a cooled plate and in a downstream pocket filter known from the prior art.

3) Liquid Ring Pumps

Operating fluid pumps can be in the form of liquid ring pumps. If water is used as the operating fluid, additional forepumps, such as, for example, single-stage or multi-stage Roots blowers (that is to say rotary piston blowers without internal compression), are usually necessary because the vapour pressure of the operating fluid influences the achievable final vacuum and pumping capacity of the pump (these being dependent on specified temperatures). Glycol or other liquids are therefore also used here. The liquid must thereby be purified during operation or replaced if required.

It is further noted that redundant systems belong very generally to the prior art. They allow, for example, individual components to be maintained while the system as such can continue to operate.

Despite the mentioned measures, there is increased contamination of the vacuum pumps. Consequently, the systems have a high outlay in terms of maintenance.

For example, there are frequently deposited in the region of a cold trap even at very low operating pressures slightly tacky powders (<=3 mbar, cooling water temperature ° C.) and at higher pressures (3 to 10 mbar, cooling water temperature −4° C. to +5° C.) liquid or multiphase substances having a solids content. Dust-like deposits are found in the particle filter, which can sometimes turn out to be tacky. As well as being dependent on the mentioned parameters of pressure and cooler temperature, the nature of the products deposited also depends on the type of cooler, the leaked air and leaks, the material processed and the extrusion parameters.

Monoethylene glycol has been identified as the main cause of clogged filter elements.

The pumping unit known from the prior art (for example DE 10 2013 000 316 A1) usually consists of a combination of Roots and screw pumps. Because the gas stream still contains residues of the waste gas, which lead to deposits on the surfaces with which they come into contact, such as, for example, pump housings and rotors, a flushing device is present. With this flushing device it is possible to inject liquids above the Roots pump during operation.

A basic construction of such an extrusion system known according to the prior art comprises an extruder or an extruder arrangement, downstream of which there are arranged a separator and one or more vacuum pumps.

The extruder can be a single-screw or multi-screw extruder. Condensate systems according to the prior art can be used, for example, as the separator, as are shown and described, for example, in DE 10 2013 000 316 A1. Such condensate systems can also comprise filters or combinations of separator and filter. Associated vacuum pumping units are likewise known from the prior art.

Against this background, it is the object of the present invention to provide an improved method and an improved device for degassing melts, in particular polymer melts.

This object is achieved in respect of the method by the features described in claim 1 and in respect of the device by the features described in claim 12. Advantageous embodiments of the invention are described in the dependent claims.

The present invention provides a significantly improved method and a significantly improved device for degassing melts, that is to say in particular polymer melts. This is made possible by an improved waste gas purification device.

The waste gases are neutralised to the greatest possible extent in a waste gas purification device, so that either no further purification is required or the remaining residual substances can be removed with minimal outlay, and negative solid/liquid ingredients can easily be filtered out upstream of the pumps.

A plasma device is used as a fundamental component of the waste gas purification device.

A method is proposed which allows the waste gases to be neutralised leaving virtually no residue.

No differential pressure increase across the filter was discernible with the plasma source activated.

This preferably comprises the following steps:

Condensates, resublimates, deposits, coked substances and contaminants are avoided by controlling the temperature of the respective feed lines in order to prevent the formation thereof as far as the active plasma.

The feed lines are in the form of heated lines and can be heated in a controllable, limited temperature range.

The method is regulated in such a manner that explosive atmospheres in the pump region are avoided by permanent oxidation. For this purpose, a control system can be provided which feeds preferably external air or water vapour or also other process gases such as oxygen, nitrogen, carbon dioxide or argon into the process. In principle, any available gases that are helpful for the desired reactions are conceivable.

The following advantages are obtained as a result of the method:

Use of dry-running pumps without a flushing device.

Water separation downstream of the Roots pump in a higher pressure range; as a result, the water vapour is separated off (removed by condensation) better.

Screw pumps can optionally be chosen with a smaller overall size.

In the known solutions, the contaminated components can be maintained economically only within prolonged periods. Regardless of the appearance of the deposits, a decrease in the efficiency of the separators, such as solids separators, condensate separators or sublimate separators, is to be observed within this period.

In order to reduce the system outlay, the maintenance intervals can be increased.

In addition, the economy of the processes to be carried out with the device according to the invention can be improved significantly within the scope of the invention.

Furthermore, the service life of the vacuum system and in particular that of the vacuum pump provided in the vacuum system can also be increased by the present invention, and disposal problems that exist in the prior art can be eliminated.

Residual substances hitherto formed are eliminated and do not additionally have to be disposed of.

Within the scope of the invention, it is provided that energy in general or, for example, thermal energy is supplied to the waste gases and/or pollutants, and/or said waste gases or pollutants are converted to the plasma state by some other means. When the waste gas or pollutants are excited in order to convert them to the plasma state, molecules that are present are ionised wholly or in part. Since the gases are no longer maintained in the plasma state, the particles can react to form compounds which are advantageous in terms of energy. These are predominantly gases, which can be pumped without further filtering.

Plasmas of different types are produced by numerous methods, see, for example, /PlasTEP Conference Proceedings, Tartu, 2012/, and used, for example, for the modification of substrates. Plasma treatment is used, for example, for coating, cleaning and etching substrates, in medicine for treating implants, and in engineering for waste gas purification. The geometry of the workpieces to be treated ranges from flat substrates, fibre bundles or materials in sheet form to mouldings of any desired shape. Microwave plasmas are of considerable importance due to high efficiency and the ready availability of microwave generators.

Various sources for plasma treatment, such as microwaves (MPS microwave plasma sources), corona (DC and RF), high voltage devices (US 2009 146 349) and RF sources (to the GHz range), are known (examples of known manufacturers of microwave plasma sources are: Muegge (http://www.muegge.de/de/produkte/); CS Clean Systems, Piranha, EP 885 455 and EP 992 052, EP 872 164; for RF sources: DryScrub; Advanced Energy, Litmas Blue; ASTeX, ASTRON). See also PlasTEP Conference Proceedings, Tartu, 2012. This prior publication also speaks of or distinguishes between, for example, cold or non-thermal plasma, a hot non-thermal plasma (transition plasma) or a thermal plasma.

Within the scope of the invention, microwave plasmas are preferably used as the purification device, but the other possibilities for plasma generation are in principle not to be ruled out. According to the prior art, these microwave plasma sources are automated in that the coupling in of the microwaves is adjusted automatically (automatic tuner TRISTAN (Muegge GmbH)). The plasma of a glow discharge can also be used in the pressure range from 1 mbar to 50 mbar.

A plasma is another state of aggregation. The solid, liquid and gaseous states of aggregation are passed through by increasing the temperature (for example supplying thermal energy). In principle, this also applies in continuation to plasma. If the temperature of a gas is increased ever further, atoms and nuclei as ions are eventually present separately from one another. This state is called thermal plasma. However, a plasma can also be generated by exciting almost only the electrons. This is referred to as a non-thermal or non-equilibrium plasma.

Plasma is used in industry in various fields. Thermal plasmas, for example, are used for welding, separating and for gas processing. For coating or for surface modification, plasmas at atmospheric pressure or under high vacuum are used. They are also used to break up fluorine compounds, which are either toxic or have a high climate potential and must otherwise be removed from the waste gas downstream of the vacuum pump by other separating methods (scrubbers, adsorbers, etc.). Warfare agents have also already been destroyed at atmospheric pressure with the GlidArc systems. The decomposition of refrigerants has likewise been described.

Many devices of different constructions are used to generate microwave plasmas. According to the prior art, these devices contain a plasma chamber, a receiver, or effective space, located therein, and a feeding hollow conductor coupled thereto, which is often in the form of an encircling hollow conductor resonator.

In these devices, microwaves are irradiated into a plasma chamber via a feed line and optionally a coupling. Different plasmas have different uses. For feeding in the microwaves, hollow conductors and coaxial cables are used inter alia; antennas and slots are used inter alia for the coupling (DE 42 35 914 A1).

In summary, therefore, the present invention relates in particular to a method for degassing polymer melts and for neutralising the waste gases formed thereby prior to continuous processing to drawn polymer films, wherein preferably a solid plastics material to be processed, in particular in granule form, is melted by a plasticising unit (extruder), and one or more liquid or solid additives (for example plasticisers, lubricants, antistatics, etc.) are added to the plastics material, and the mixture of melted plastics material and additives is degassed in one or more vacuum zones of a plasticising unit which is/are connected to a vacuum system; and the waste gases are neutralised in a separating device or purification system, and the entire system is to be so designed that condensates, resublimates and contamination by organic deposits and coked substances are avoided.

Vacuum degassing of the liquid melt is necessary, for example, in the processing of undried PET, for example. By using a twin-screw extruder, it is possible to make a saving in terms of predrying. An expensive dryer/crystalliser process is thereby avoided. This requires a large amount of energy, and several tonnes of material must be kept available at a sufficiently high temperature. For a uniform melt quality, the dwell time as well as the temperature and moisture in the dryer must be kept constant.

With the system according to the invention comprising a twin-screw extruder, a purification or neutralisation device and a vacuum system, the moisture contained in the material, which can be up to 4000 ppm, can be reduced to below the detection limit without predrying. To that end, there are provided in the process part of the extruder one or more degassing zones which, assisted by the material transport in the extruder, permit large-area degassing.

Degassing is provided because, at conventional extrusion temperatures (260° C. to 300° C.) and conventional vacuum pressures (0 mbar to 100 mbar), the moisture present is converted into the gas phase (indicate vapour pressure: water 260° C.~42 bar, 280° C.~55 bar (see also Antoine equation).

In addition, other organic residues enter the vacuum system. These are formed in part by a back reaction of the PET to monoethylene glycol and terephthalic acid, but also by thermal and hydrolytic damage to the material during melting. In addition to the polymer, air and water, also cyclic and linear oligomers, acetaldehyde and, in the case of PET, 1,2-ethanediol, 1,4-benzenedicarboxylic acid, 2-methyldioxolane and further undefined degradation products form. In the case of PP there form, in addition to the oligomers, esters, amines and volatile constituents owing to the addition of additives (antistatics, lubricants, slip), such as glycerol monostearate and erucic acid amide. These hydrocarbons adhere to the walls if there is insufficient heating and react to form long-chained molecules which can usually be removed only with a high outlay in terms of maintenance.

The invention is explained in greater detail below by means of embodiments. Specifically, in the drawings.

Figure 5:
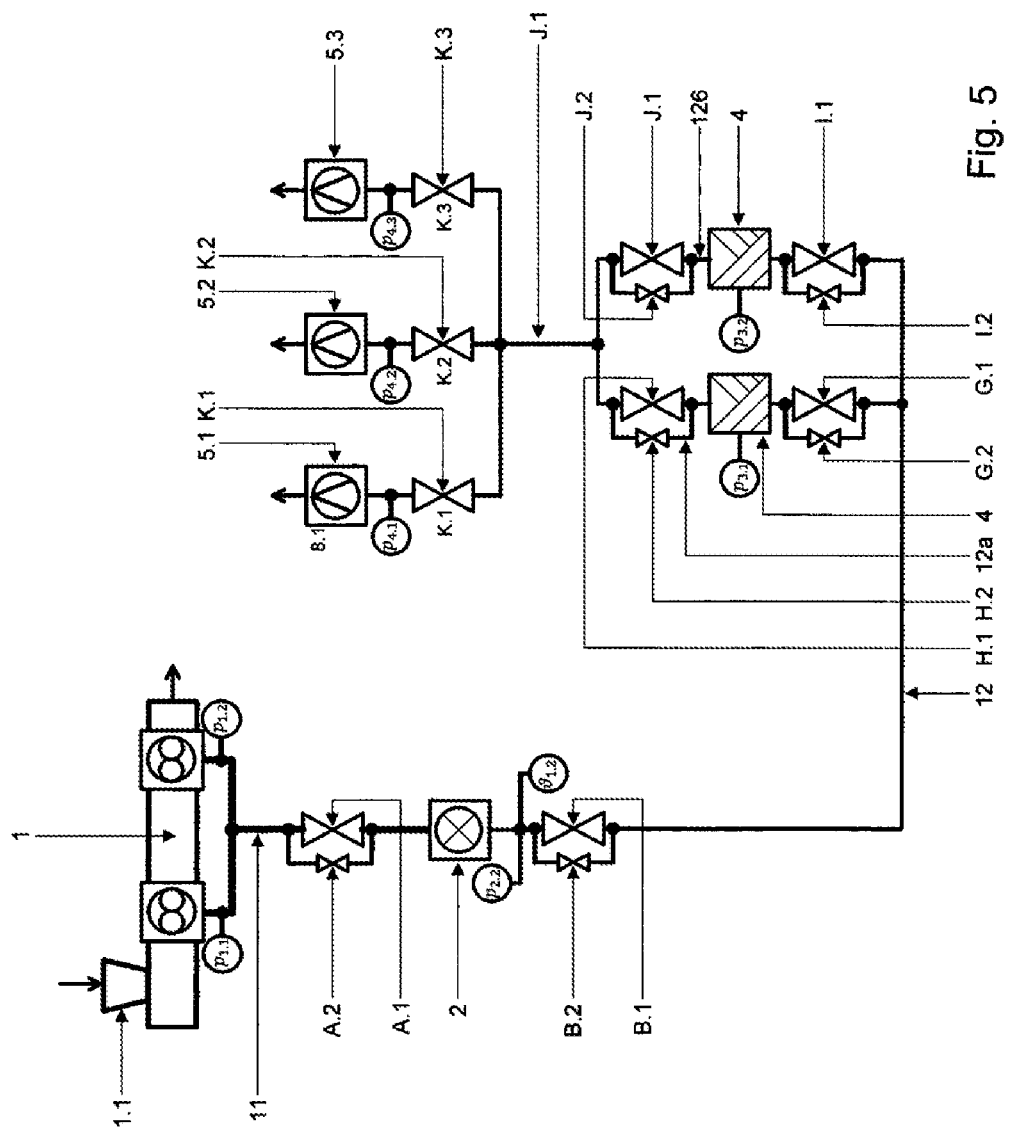
FIG. 5 shows a system of simplified construction with only one degassing line and a separator arrangement of redundant design.
Figure 6:
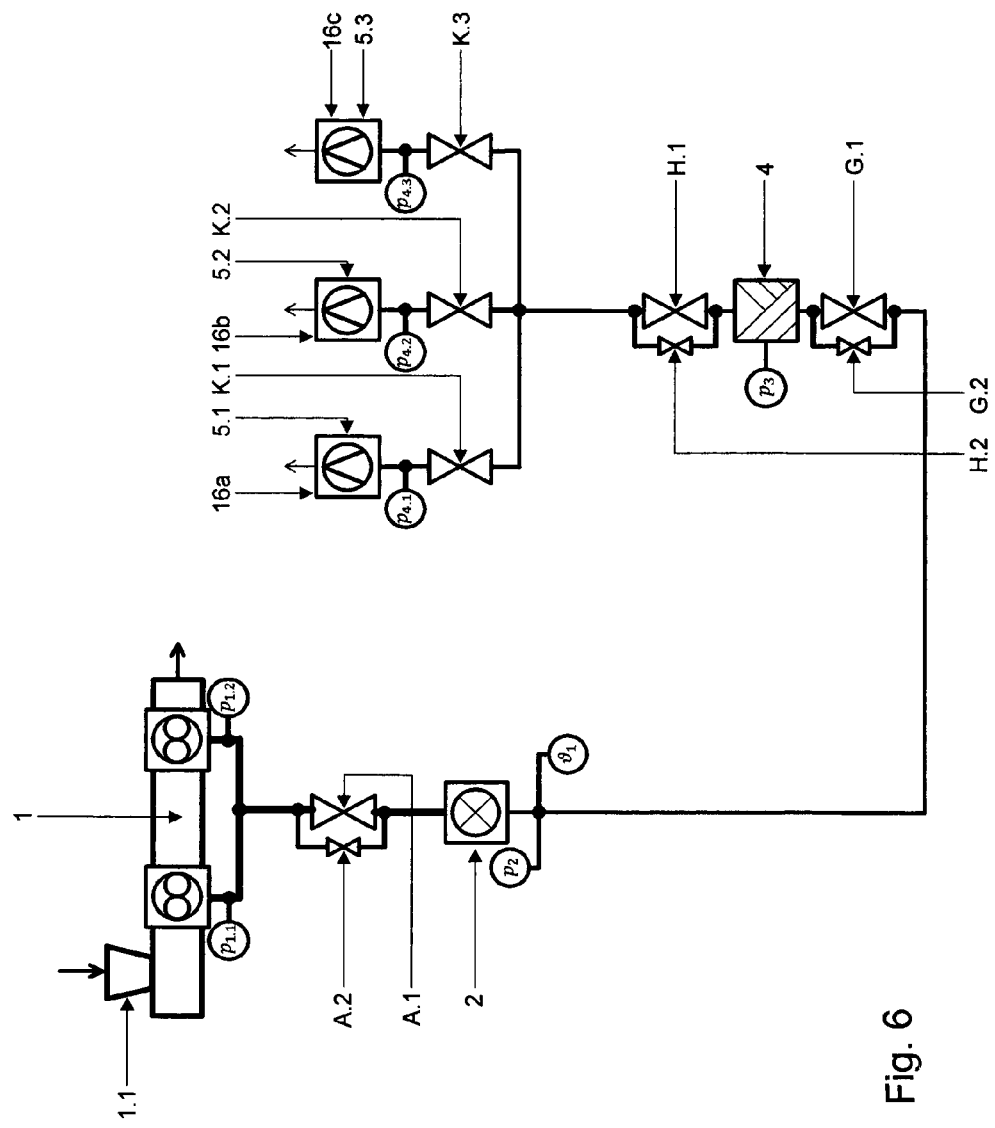
Figure 7:
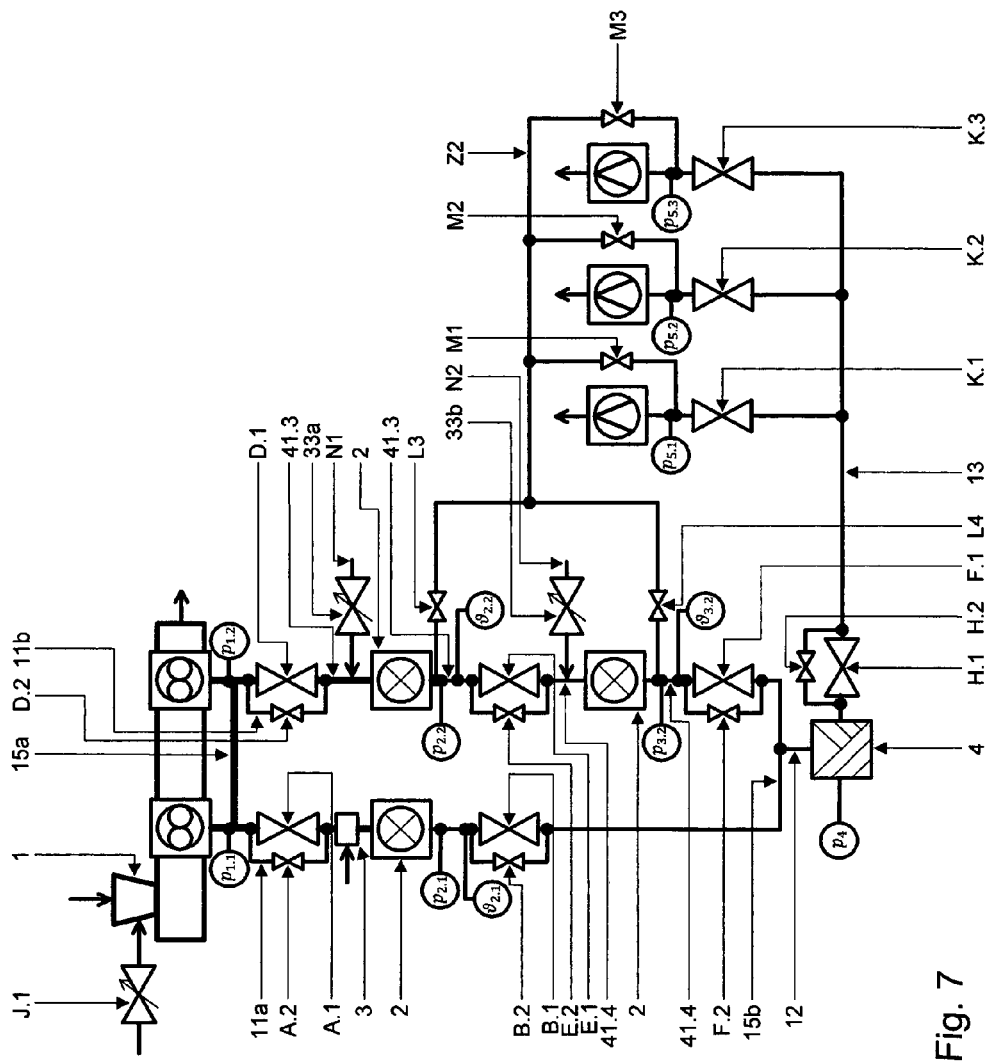

FIG. 6 shows a system which is simplified again compared to FIG. 5, without a redundant separator branch; and FIG. 7 shows a further modified embodiment having two degassing lines connected in parallel, wherein in one degassing line there is only one plasma source and in the second degassing line running parallel thereto two plasma sources are connected in series, wherein this one branch can be connected with an additional redundant line system to the pumping station.

The basic principle of the invention will be described in greater detail below with reference to FIG. 1.

Figure 1:
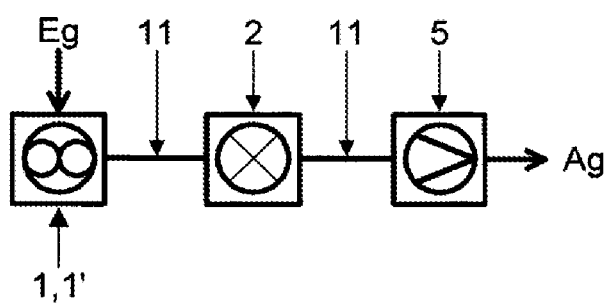
FIG. 1 is a schematic representation of a first embodiment according to the invention.

FIG. 1 shows, in a schematic representation, a plasticising unit 1, for example in the form of an extruder or, for example, in the form of a twin-screw extruder 1.1', a plasma source 2, connected downstream, and a further vacuum system 5 connected downstream of the plasma source 2, which in some cases is also referred to as a low pressure system 5. The arrangement as a whole is connected together via lines 11 (pipes).

FIG. 1 therefore shows the simplest conceivable structure of the arrangement according to the invention, in which the mentioned plasma source 2 can be used directly after the extruder 1,1' and thereby renders any separation superfluous.

A corresponding plasticising unit 1 according to the first embodiment of FIG. 1 comprises, for example, an extruder 1,1' which, as is known, generally has at least one or two (or more) plasticising screws. This at least one plasticising screw (not shown in detail in FIG. 1) of the plasticising unit 1, optionally with the aid of heating devices or heating belts, allows the plastics material fed to the plasticising unit 1 to be stirred and optionally mixed with a supplied additive. At the same time, the plastics material is melted. The plastics melt enters the region of influence of one or more vacuum zones 5 of the system as a whole.

The two vacuum domes of the twin screw, for example, are in this case insulated in order to avoid condensates. The lines are brought together and the gas temperature is determined via a thermocouple.

In principle, the solution according to the invention can be used in all types of vacuum degassing on extruders, that is to say, for example, also in the case of side degassing. In general, the interior of the plasticising unit 1 filled with the melt is connected via a corresponding opening in the housing to the mentioned vacuum zone 5. Finally, the plastics material fed to the plasticising unit, for example at the mentioned input Eg, is then discharged in melted form at an output Ag.

Also known are extruders to which melt is fed and degassing also takes place in the intake shaft.

Although it is already known in principle that plasma sources are used, for example, in the semiconductor industry, namely for waste gas treatment, the plasma sources are in this case used upstream of the vacuum pumps, at a maximum pressure of 1 mbar. All other applications have hitherto been carried out either at atmospheric pressure (~1000 mbar) or under high vacuum (<1 mbar).

It is, however, wholly novel to use a plasma source in a plastics processing machine or system, that is to say in the vacuum system of an extruder (single-screw and multi-screw extruder) and to treat the waste gases directly at the location at which they are formed, as is described for the first time within the scope of the present invention. In addition, the pressure range at the extruder is not comparable with other applications. The pressures of, for example, BOPET: 5 to 10 mbar, MOPET: 10 to 15 mbar, BOPP: 80 to 120 mbar and BOPA: 200 to 300 mbar required in the extrusion have hitherto not been achievable.

Figure 2:
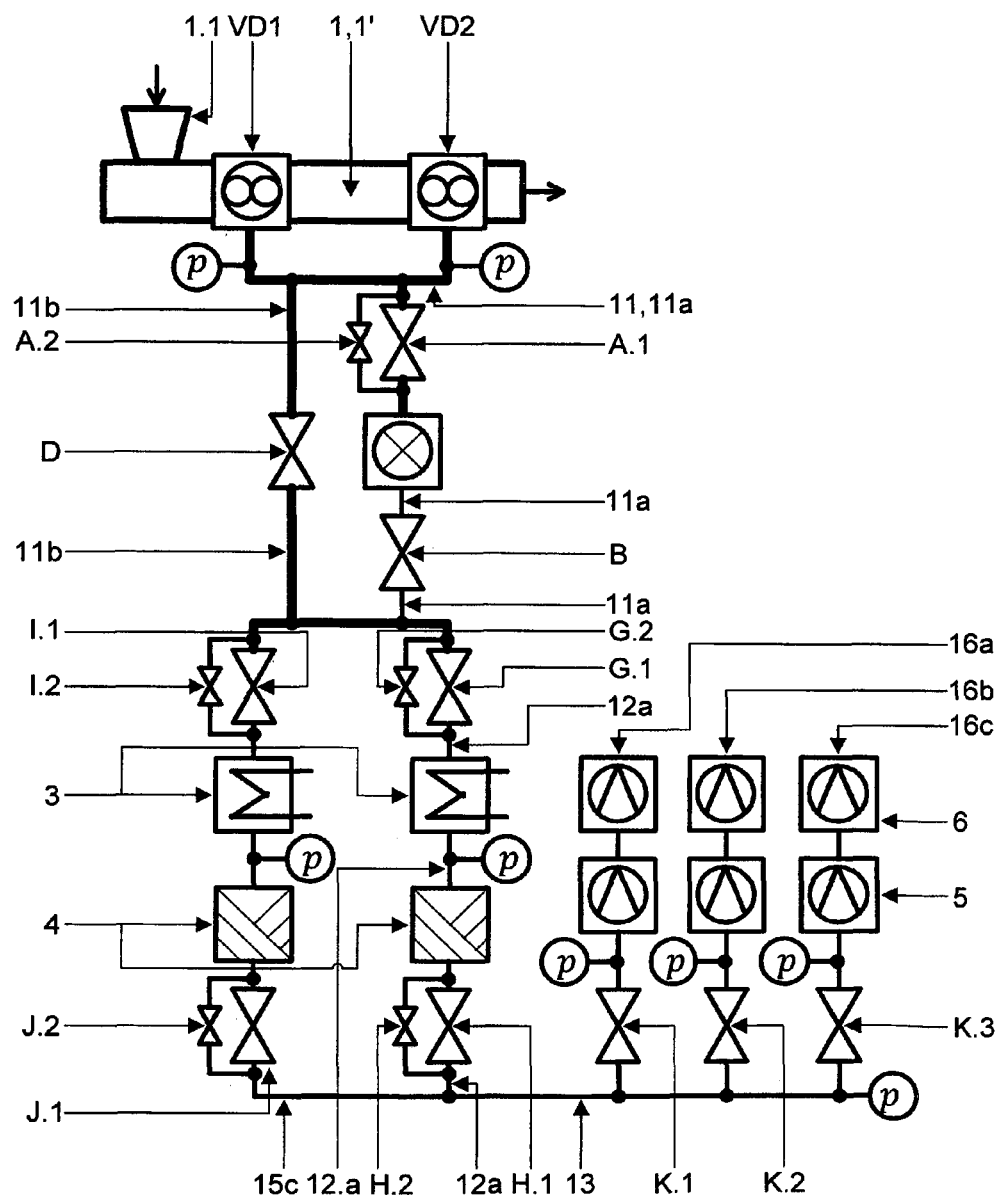
FIG. 2 shows a schematic test system by means of which the superiority of the solution according to the invention over a system used according to the prior art can be demonstrated.

Reference will be made hereinbelow to FIG. 2, which shows a test device for determining the efficiency of the solution according to the invention. In this case, plastics granules which are fed to the plasticising unit 1, 1' via the input E, for example in the form of a feed hopper 1.1, are melted in the extruder 1,1' shown schematically.

In the one vacuum zone or optionally the plurality of vacuum zones, here VD1 and VD2, a melt (plastics melt) is degassed. To that end, a vacuum and/or degassing line 11 is provided, which is also referred to hereinbelow as the degassing line 11a. Via this line, a connection is established between the vacuum zone VD, here the vacuum zones VD1, VD2, and the vacuum system 5, 6, which preferably comprises a plurality of vacuum pumps, via the plasma source 2, which will be discussed hereinbelow, and optionally further cold traps 3 and filters or separators 4 as well as via further line portions. In order to be able to quantify the efficiency of the plasma separation, a bypass line 11b with a closing valve D held therein is additionally provided. By opening a bypass valve D in the bypass line 11b and closing valves A.1, A.2 and B in the degassing line 11a comprising the plasma source 2, the situation according to the prior art can be reproduced, in which the waste gases are separated in cold traps 3 and particle filters 4. The efficiency of the plasma source can be demonstrated by comparative measurements of the separation amounts and rates at the separators 3, 4 with/without the plasma source 2.

The embodiment with a test device according to FIG. 2 thus shows that the two vacuum zones VD1 and VD2 provided there (where the degassing takes place within the extruder) are alternatively connected to subsequent treatment stages via the degassing line 11a or the bypass line 11b running thereto by opening or closing the respective switch valves provided in the lines.

The subsequent treatment stage comprises a line 12a in which there are connected in parallel with one another, for example, a closing valve having a larger flow cross section and a closing valve having a smaller flow cross section G.1, G.2. Following these valves there are provided, for example, a cold trap 3 and a separator or filter (particle filter) 4. These are followed, in series, by a further switch valve arrangement with a larger switch valve H.1 having a larger flow cross section and a smaller switch valve H.2, connected in parallel, having a smaller flow cross section.

This line portion 12a comprising the above-mentioned device is followed by a further line 13 which leads to a vacuum system 5, 6, which in the embodiment shown comprises three parallel branches 16a, 16b, 16c each having two vacuum stages or vacuum pumps 5, 6 connected one behind the other. On the input side, these vacuum systems can each be shut off or connected to the line 13 via a switch valve K.1, K.2 or K.3 so that the corresponding vacuum cannot act as far as the degassing zone VD, that is to say as far as the degassing zones VD1 or VD2.

The further treatment stage discussed above with valves G.1 and G.2 having a larger and a smaller flow cross section connected in parallel as well as a following cold trap 3 and a filter or separator 4 (for example in the form of a particle filter) and a following switch valve combination, connected in parallel, with switch valves H.1, H.2 having a larger flow cross section and a smaller flow cross section is additionally provided in a line 12b parallel to the first line 12a (with the valves I.1 and I.2 as well as J.1 and J.2).

For the test, the bypass line 11b connected in parallel with the line 11a is provided, which bypass line does not comprise a plasma stage 2 but, for example, merely a switch valve D.

It will also be seen from the representation according to FIG. 2 that the two degassing zones VD1 and VD2 are connected together via a connecting line 15a. Likewise, the two end portions of the bypass lines 11a and 11b downstream of the switch valves D, B in the flow direction are connected together via a connecting line 15b. Finally, however, the portions of the lines or pipes 12a, 12b downstream of the switch valves H.1 and H.2, on the one hand, and J.1 and J.2, on the other hand, in the flow direction are also connected together via a connecting line 15c.

Accordingly, a further bypass line 12b is obtained, which is connected in parallel with the line portion 12a comprising the device 3, 4 and is of the same construction as the components arranged in the line 12a. In other words, two switch valves I.1, I.2 connected in parallel with one another, a downstream cold trap 3 and a separator or a particle filter 4 arranged downstream of the cold trap 3 are also provided in the line 12b. On the output side there are then again provided two closing valves J.1 and J.2 connected in parallel, the output line of which is connected via the connecting line 15c to the output of the first line portion 12a and merges into the output line 13, via which the vacuum systems are connected.

Within the scope of the invention the lines 11, 11a, 11b are additionally heated upstream of the separators 4 in order to avoid contamination. This occurs in the case of the processing of PET in the range from 200° C. to 300° C. In addition, large cross sections and a readily accessible cleaning flange are provided.

The temperature of the vacuum and/or degassing lines 11a, 11b and 12a, 12b leading in the embodiment according to FIG. 2 to the two cold traps 3 described therein is controlled, for example at a temperature of from 150° C. to 300° C., in order to rule out condensation (and/or sublimation) of the waste gases in this pipeline to the greatest possible extent. This is important for operation in a production system in maintenance-free operation. Each surface in the vacuum system, upstream of the plasma source, the separation or the filters, must be heated sufficiently. The plasma source must be adapted in this respect.

The vacuum line is additionally distinguished in that the penetration of melt from the plasticising unit into the vacuum line is prevented by a special device (melt trap).

The plasma source provided in the bypass line 11a is an apparatus which wholly or partially ionises the gas flowing through and thus initiates chemical reactions.

The suitability in principle of the plasma source for treating the extrusion waste gases can be demonstrated by extensive reference tests on a production system.

The plasma source is supplied with energy by a microwave generator. The plasma source can be flowed through as a tubular component. The diameters of the inlet and outlet openings of the plasma source are limited owing to the microwave frequencies used. At larger diameters, microwaves are also coupled into the pipelines, or guided out of the plasma source. The function is thus no longer given (this applies only in the case of implementation by means of a microwave plasma source).

Depending on the variant, there is situated in the plasma source, for example, a quartz pipe which is sealed with respect to the housing by polymer seals. This is used as a microwave window and serves as separation between surrounding atmospheric pressure and vacuum on the process gas side. The component surrounding the process chamber is the "ring resonator" and serves to distribute the microwaves around the periphery of the process chamber as well as to couple the energy uniformly into the process chamber via coupling slots (function of an antenna).

According to the prior art, there can be used on the intake side, for example, a "vortex nozzle" or waveguided nozzle, which is, for example, a thick-walled aluminium pipe which has drill holes introduced tangentially. The process gas is thereby forced onto a helix-shaped path. At higher flow speeds, a higher particle density thus prevails in the vicinity of the process chamber wall, which is to prevent direct contact of plasma with the wall and prevent damage thereto. In addition, the dwell time in the process chamber and mixing are better. The plasma source itself can be equipped with water cooling in order to cool the intake regions and also maintain the polymer seals at the quartz glass at controlled temperatures. Small drill holes are introduced into the ring resonator, which allow the plasma to be observed but serve in principle to cool the quartz glass. A cooling air stream is preferably drawn over the quartz glass with an external blower.

A preferred embodiment has been found to be a flow through the process chamber from bottom to top. The flow direction prevents any solids or condensates from being able to pass untreated through the plasma source.

The mentioned cold trap 3 is understood as being an apparatus for cooling the gas stream and for optionally removing corresponding ingredients, for example water or hydrocarbons, by condensation. Possible forms according to the prior art are forms as cooling fins with a small surface area or tubular heat exchangers. The housings are likewise cooled, the heat exchangers can in part be cleaned in operation, as is also known in principle from DE 10 2013 000 316 A1 or EP 2 209 694 B1, which have already been mentioned.

A separator, filter or particle filter 4 is understood as being an apparatus for separating particles from the gas stream when large-area fabric filters are used. Hydrocarbons are usually also separated at the filters, which form only by dust-like deposits from the gas phase. Kinetic separators are also known here which separate particles by their density difference with respect to the gas stream, for example cyclones and centrifuges.

The mentioned vacuum system can be so constructed that in each of the three branches shown in FIG. 2 there is provided in the line 13 (after passing through a closing valve) a Roots blower 5 and, following it, a screw pump 6.

The Roots blower can be a high-volume vacuum pump, which is able to build up only a low differential pressure.

The mentioned screw pumps 6 can be, for example, backing pumps for the Roots blower.

In FIG. 2, a plurality of pressure measuring devices p are further connected in at different points, in order to be able to measure the current pressure at the points or zones in question. Temperature measuring devices T can likewise be connected in at different points.

In order to perform the test, on the one hand the valve D can be closed and the valves A.1, A.2 and B opened, but also the subsequent valves with the line 12a or 12b, in order to operate the system with connection of a plasma source 2 and to record the corresponding measurements regarding the result of the degassing which has been carried out.

The valves in the degassing line 11a comprising the plasma source 2 can then be closed and the valve D in the bypass line 11b opened, in order to carry out the operation in the conventional sense and then effect the corresponding measurements. The clear superiority of the use of a plasma source is immediately evident from this comparison.

It is noted that the connecting line 15b between the two lines 11a, 11b or 12a, 12b is not absolutely necessary. The test with connection of the plasma source 2 is preferably carried out with only one cold trap 3 and one separator 4 in one line section, for example the line section 12a, whereas the valves block and shut off the line section 12b connected in bypass, just as the valve D closes the bypass line 11b. For the comparative test of the shutting off of the valves in the degassing line 11a and optionally the subsequent line 12a, a conventional operation can then be carried out using the cold trap 3 and separator 4 provided in the second line 12a, in order to be able to evaluate the tests separately. Otherwise, only one line system 12 could also be provided instead of the two lines 12a, 12b connected in parallel, so that the waste gases are always guided via the same cold trap 3 and the same separator 4 irrespective of whether the plasma source 2 is connected in or shut off.

Figure 3:
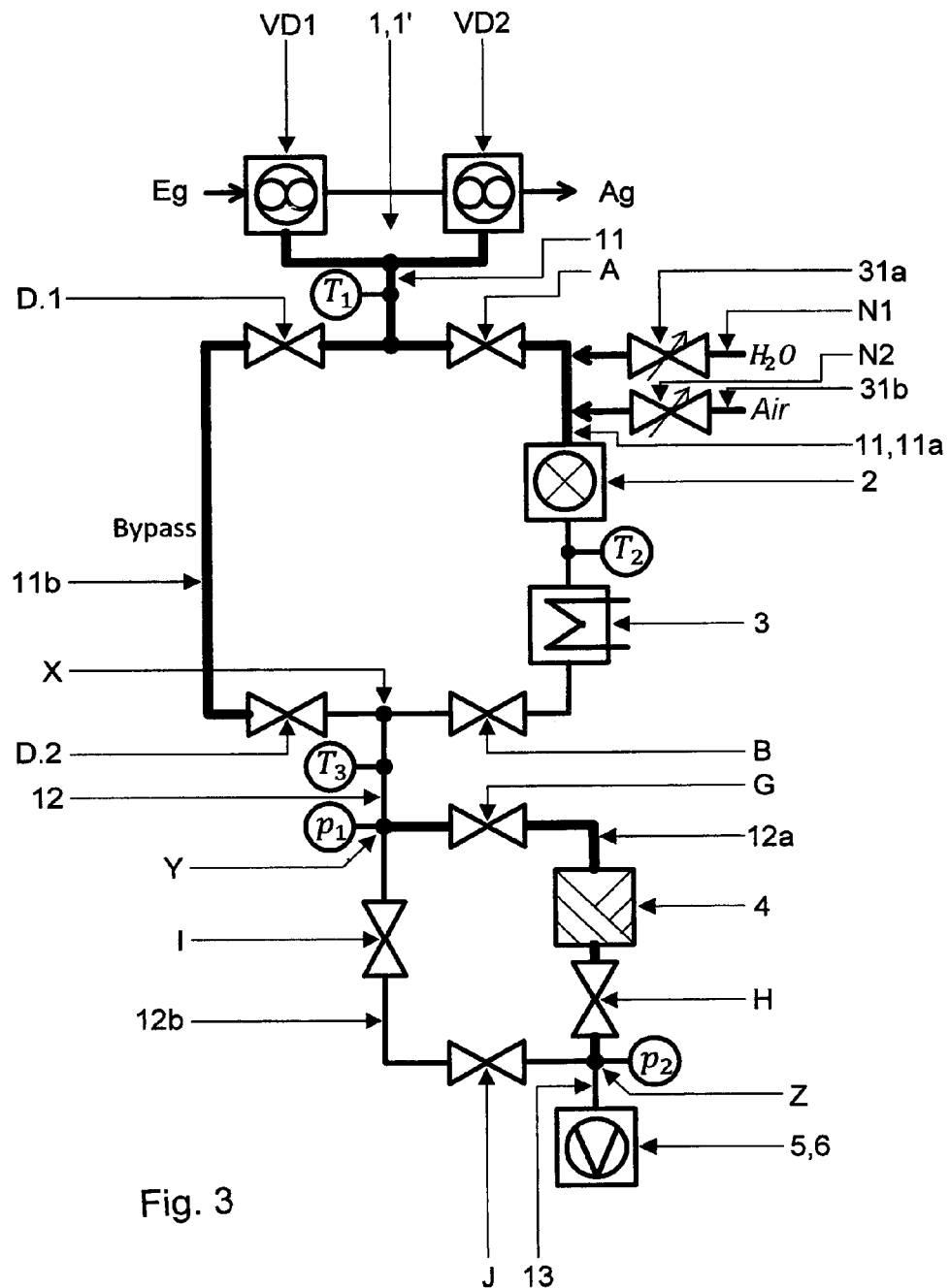
FIG. 3 shows a modified embodiment with a simplified structure.

Reference will be made hereinbelow to FIG. 3, which describes and shows a system according to the invention which in principle has a similar construction to the test system according to FIG. 2. The system according to FIG. 3 additionally includes the possibility of feeding in further reactants.

In the system according to FIG. 3, the gas cooler 3 shown in FIG. 2 is connected immediately downstream of the plasma source 2, namely in the line portion 11a. Therefore, only the separator or filter, in particular in the form of a particle filter 4, is provided in the subsequent line 12, 12a, there being arranged a valve G upstream and a further valve H downstream of this particle filter 4 in the line branch 12a, via which valves the respective branch can be opened and closed in the flow direction, as is also the case with the other valves or switch valves mentioned. In the bypass line 12b provided therefor, two switch valves I and J are likewise connected in series, although only one switch valve would in principle be necessary. In the embodiment shown, a connecting line 12 runs between the connecting point X, at which the degassing line 11a and the bypass line 11b are interconnected, and the input-side branching point Y, at which the two subsequent line and pipe systems 12a and 12b which run parallel are branched. On the output side, the two branch or bypass lines 12a, 12b are again brought together at a connecting point Z and connected via a line 13 to a pumping unit 5, 6, which in turn can be equipped, in one or more stages, with pumps etc. connected in parallel and/or in series.

The degassing line 11a connected via the connecting line 11, 11a to the vacuum zones VD1 and VD2 thus comprises (as in the other embodiments) on the input and output side a valve (closing or switch valve) A and B, there being provided between these two valves on the one hand the plasma source 2 and, downstream thereof in the flow direction, a cooler 3. In the embodiment shown, there are provided in the bypass lines 11b connected in parallel therewith not only one valve D but two valves D.1 and D.2 connected in series, in order to either open or close this line.

In this system according to FIG. 3 too, pressure measuring devices p, for example $p_1$ and $p_2$, and temperature measuring devices T, in particular $T_1$, $T_2$ and $T_3$, are again connected in at various points. These measuring devices can also be provided in addition or alternatively at other points.

It is thus shown, by means of FIG. 3, that the possibility has been created, upstream of the plasma source 2, additionally to introduce water vapour and/or air or other gases via connectable connections N1, N2 if reactants are lacking (incomplete oxidation, formation of carbon black) (plasma based depollution). Reactants are here especially the water contained in the material and the leaked air conveyed concomitantly. Oxidative processes are thereby initiated. The leakages present can also purposively be loaded with other gases so that the reaction can purposively be influenced, for example loading the feed with carbon dioxide or argon. An additional advantage here is that oxidative degradation of the melt is avoided. Disadvantages are the additional costs for the gas. For the two mentioned connections 31a and 31b, control valves 33a and 33b whose flow rate can be regulated are preferably used in order to feed the reactants in a metered manner.

In addition to this feeding, the granules or additive can also be covered with a veil of gases or gas mixtures, which likewise has a positive effect on the reactions in the plasma source (which will be discussed below).

A gas cooler can optionally be incorporated downstream of the plasma source, as mentioned, so that any gas heated in the plasma source can be cooled.

A variant of a redundant production system in serial form will be discussed hereinbelow with reference to FIG. 4.

Figure 4:
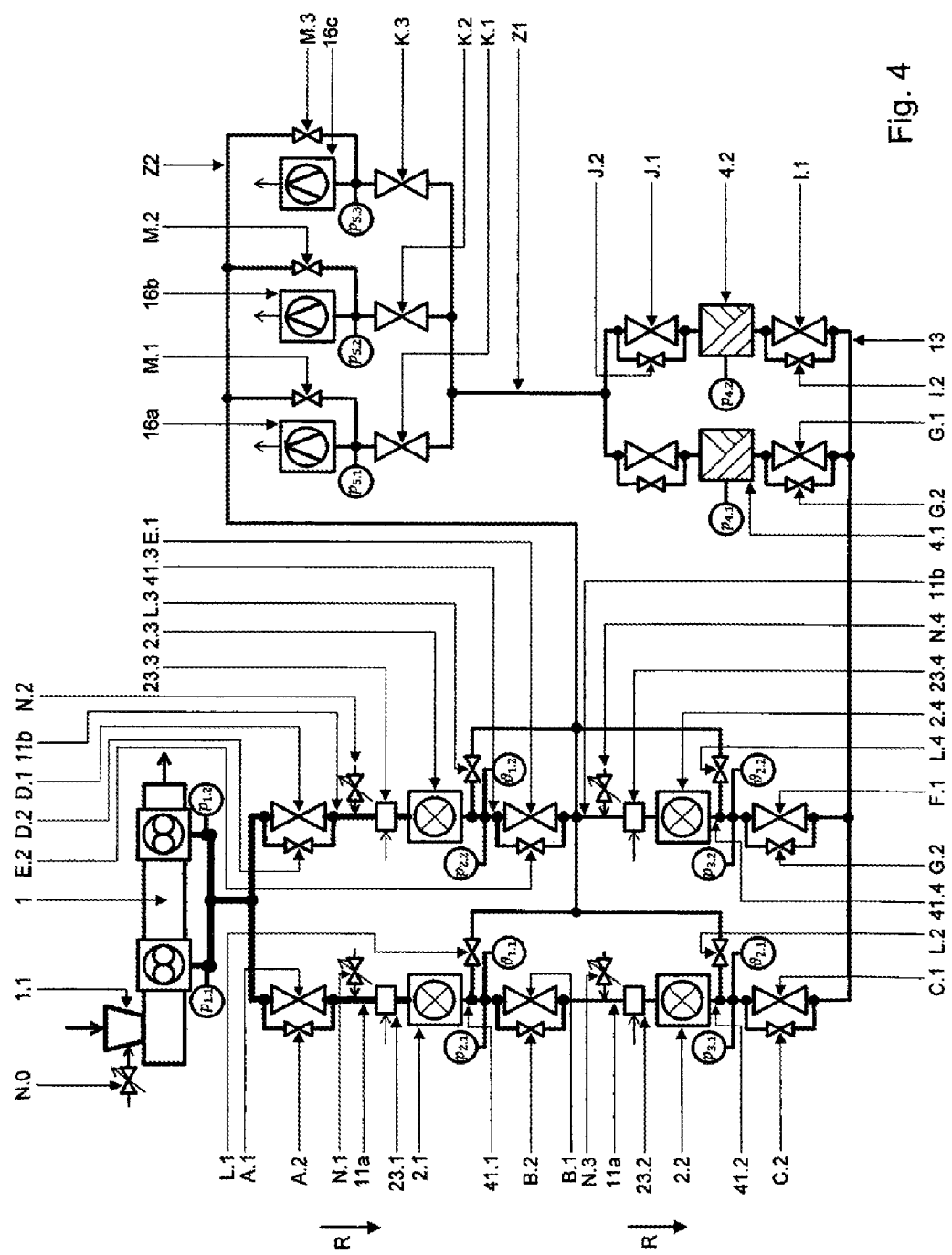
FIG. 4 shows an example of a system with serial and parallel multiple redundancy having four plasma zones or plasma sources and an additional redundant pipeline system.

FIG. 4 shows an extruder 1 having a vacuum system. This vacuum system is of multiple redundant design. By way of example, the respective plasma source sections 2.1 and 2.2 as well as 2.3 and 2.4 are present in duplicate, as are the separators 4.1 and 4.2.

The multiple redundant design is thus obtained by providing on the one hand two branches, connected in parallel, with a line system 11a, 12a and a line arrangement 11b, 12b parallel thereto, wherein two plasma sources 2.1 and 2.2 or 2.3 and 2.4 are arranged, in each case connected in series, in each of the two sections which are connected in parallel and can be operated together or can be operated as an alternative to one another.

In each of the two treatment sections with the line or pipe system 11a, 12a or with the line arrangements, parallel thereto, having the line portions 11b and 12b there is connected in series in addition to the plasma sources 2.1 and 2.2 already mentioned and present in each section a second plasma source, namely the plasma source 2.2 in line arrangement 11a, 12a and the plasma source 2.4 in the line arrangement 11b, 12b parallel thereto. Corresponding switch valves are arranged upstream and downstream of the plasma sources, preferably also in the form of parallel switch valves (which can have different flow cross sections), in order to be able to carry out a particularly regulated and fine switching or changeover or a particularly delicate opening and closing operation.

Three pump sections 16a to 16c are further shown. The number of parallel systems is for illustration only. Further pump sections connected in parallel are also conceivable in order to increase the reliability. The serial arrangement of the plasma sources permits higher powers, which can be introduced into the gas by the plasma source and, owing to the two-stage design, purposive initiation of reactions. A reduced power in the first plasma source can accordingly be used for partial oxidation and, after addition of any process gases (for example oxygen), complete oxidation can take place in the following plasma source.

The filling hopper 1.1 of the extruder 1 is supplemented by a controllable gas supply valve N.0. By means of this valve, the material to be processed in the extruder can be covered with a veil of gas or gas mixture which preferably has a positive effect on the material processing and the reactions in the plasma, for example argon, nitrogen, carbon dioxide, oxygen, water vapour.

Controllable devices or valves N.1 to N.4 are likewise present upstream of the plasma sources 2.1 to 2.4, by means of which gas and/or water vapour can purposively be introduced into the vacuum system upstream of the plasma sources 2.

Ignition devices 23.1 to 23.4, which are in each case connected upstream of the respective plasma sources 2 in the flow direction R, allow the plasma sources to be ignited even in the absence of optimal ignition conditions with the aid of auxiliary energy. The aim is to provide ions (charge carriers), which reduce the required ignition energy. The plasma source is thus capable of building up and maintaining a plasma even under non-optimal conditions.

The plasma sources 2.1 and 2.2 connected in series and the plasma sources 2.3 and 2.4 connected in series are preferably directly separated from one another and capable of being shut off by valves B.1 and B.2 and E.1 and E.2, independently of the remainder of the vacuum system (with regard to the arrangement and switching of the further switch valves A.1, A.2, C.1, C.2, D.1, D.2, F.1, F.2, G.1, G.2, H.1, H.2, J.1, J.2 and the valves K.1 to K.3 and N.1 to N.3, reference is also made in particular to the representation according to FIG. 4. It is clear therefrom where the respective valves are arranged in the flow direction. This arrangement applies not only to the embodiment according to FIG. 4 but also to any modifications thereof. By means of these valves, opening or closing of a line or pipe section can be carried out preferably upstream and/or downstream of a component (such as, for example, a plasma source 2 with or without an upstream ignition device, a filter and/or a cold trap 3 which is generally not necessary within the scope of the invention, etc.).

The separators 4.1 and 4.2 each also contain a gas cooler (as described above). These can also be separated completely from the system and controlled separately by the valves H and G or J and I.

The pumps provided (here 8.1 to 8.3) are separated from the vacuum system by valves K.1 to K.3 and can be connected in or shut off by the process control system according to the required throughput or problems that occur.

Continuous operation of the system can be carried out in such a manner that, for example, the two plasma sources 2.1 and 2.2 connected in series are opened by corresponding reversal of the control and/or switch valves provided in this treatment section or this treatment line 11*a* and the corresponding control and/or switch valves in the line or pipeline 11*b* connected in parallel therewith are closed. Should a problem occur during operation at one or both of the actively connected plasma sources 2.1 and/or 2.2, it would be possible, owing to the redundant design, to change at any time to the plasma sources 2.3 and 2.4 in the second treatment branch 11*b* by opening the control and/or switch valves provided there and by closing the switch and/or control valves provided in the first pipe system 11*a*. In this case too, two plasma sources 2.3 and 2.4 connected in series would be active in the redundant design.

The structure according to FIG. 4 is, however, also of redundant design if, for example, problems should occur at the second plasma sources 2.2 and/or 2.4, and one or both of these plasma sources is to be shut off.

To that end, valves M.1 to M.3 additionally provided at the vacuum pumps and valves L.1 to L.4 installed at the plasma sources are connected via a separate line system Z2 and constitute an auxiliary system. The mentioned line system Z2 is connected on the input side of the vacuum station, that is to say of the pump sections 16*a* to 16*c* provided in the embodiment shown for building up a vacuum or a low pressure, namely via the mentioned valves M.1 to M.3. This line or pipe system Z2 is correspondingly branched and leads to branching points 41.1, 41.2, 41.3 and 41.4 arranged downstream of the individual plasma sources 2.1 to 2.4 in the flow direction, in each case via valves L.1, L.2, L.3 and L.4 additionally connected in the line or pipe system Z2 before the above-mentioned branching points are reached.

By closing the valves K.1, K.2 or K.3 (or, for example, the valves connected immediately upstream and downstream of the separators 4.1 and 4.2) and opening the valves M.1, M.2 and/or M.3 and the valves associated with the plasma sources, for example by opening the valves L.1 and L.3 and closing the valves L.2 and L.4, it can be ensured that, for example, only the plasma sources 2.1 and 2.3 are active during the degassing process, the plasma source 2.2 and 2.4 being shut off and blocked.

In an extreme case, the valve L.1 can also be opened or closed alternatively to the valve L.3, or vice versa, so that purposively only one plasma source is active, namely, for example, the plasma source 2.1 or 2.3. The wholly redundant design of the system is thereby increased further.

This allows the purposive establishment of a pressure at a plasma source separate from the main vacuum system with a pump separate from the main vacuum system. As a result, this plasma source can, for example, be started with a reduced pressure level compared to the main vacuum system. It can then be operated at a higher pressure level in the main vacuum system Z1. This state can, however, also be used for functional control of the plasma source.

For example, the valves A, B, C, G, H, K, M and L (in the form of single switch valves or in the form of double valves, connected in parallel, as shown in the drawing according to FIG. 4 with the single valves A.1, A.2, B.1, B.2, etc.), K.1 and K.2 in the main vacuum system are opened and effect suction, for example at 10 mbar, at the extruder. Purification of the waste gases is carried out by the active plasma sources 2.1 and 2.2. All the other valves are closed. If the second plasma section is then to be brought into operation, this part of the system is evacuated via its own pump. To that end, the valves L.3 and L.4 and also M.3 are opened and the plasma sources are evacuated to 1 mbar, for example, independently of the main vacuum system, since the critical field strength for plasma ignition is lower at lower pressure. The plasma sources 2.3 and 2.4 are ignited. After successful ignition, the valves L.3 and L.4 and also M.3 are closed and the valves D.2, E.2 and F.2 are opened. When the pressures p2.2 and p3.2 largely correspond to the pressures p1.1, p1.2 and p4.1, the main valves D.1, E.1 and F.1 are also opened. The gas stream is thus treated by both plasma source sections in parallel.

A modified variant will be discussed hereinbelow with reference to FIG. 5, which shows and describes a simpler, non-redundant system for the separation.

This embodiment according to FIG. 5 comprises an extrusion system 1 having a plasma source 2 as well as a separator system 4 and vacuum pumps 5. The plasma source 2 is of simple construction. The separation is of redundant design, so that the vacuum pumps are protected if the plasma source fails. The plasma source 2 is independently capable of igniting and maintaining the plasma. A plurality of pump sections are present, which can be connected in or shut off depending on the throughput.

The composition of the extruder waste gases permits direct treatment, so that either total oxidation of the hydrocarbons present takes place, or partial oxidation. In the case of partial oxidation or similar reactions, residual substances may remain, which can be removed from the gas stream by the separators.

In other words, this embodiment is of similar construction to the other variants but merely with a line branch 11, 12 and 13 in which the plasma source 2 and the separators 4.1 and 4.2 are arranged with the corresponding valves. This variant does not include the cold trap 3 described in the other embodiments, which could, however, also be connected in this variant according to FIG. 5 if required, for example directly downstream of the respective separator 4.1 and 4.2 in the line portion 12a and 12b directly upstream of the filter 4.1 or 4.2 between the valves G and H or I and J. One, two or more (in the example shown three) branches can again be provided at the output, in which the corresponding vacuum arrangements for carrying out parallel operation or individual connection are provided. Instead of the above-mentioned valves G and H or I and J, double valve arrangements connected in parallel can in each case also be used, as in all the other embodiments, for example as shown in FIG. 5, instead of the valve G two valves G.1 and G.2 connected in parallel, instead of a valve H two valves H.1 and H.2 connected in parallel, and correspondingly instead of the mentioned valves I and J valves I.1 and I.1 or J.1 and J.2 connected in parallel. There are no restrictions or limitations as regards such modifications in any of the entire embodiments or in other system types differing therefrom.

For starting the vacuum system, the procedure is analogous to the preceding description. During operation, only one separator section is used. If the differential pressure across the filter increases (difference p_3.1 and p_4) and exceeds, for example, 7 mbar (PET), operation is switched to the other separator.

A further variant will be discussed hereinbelow with reference to FIG. 6, which comprises an embodiment with simple plasma purification and a simple separator system 4.

Analogously to the preceding embodiments, some of the devices discussed with reference to the preceding embodiments have thus been omitted. The waste gas of the extruder 1 is treated in the plasma source 2 and passed through the separator 4.

As a result of the treatment with the plasma source, it is no longer necessary to purify the gas in the separator 4. This is retained as a gas cooler and to safeguard against failure. It is additionally possible, with the correct cooler temperature (dependent on the pressure), in some cases to separate water from the gas and thus reduce the required throughput.

Finally, FIG. 7 shows a further modification in which the system is also designed in parallel to increase the redundancy, namely with two line branches 11a and 11b and a line branch 11b connected in parallel, which are also connected together at two vacuum zones VD1 and VD2 by an intermediate line 15a. By shutting off one branch in each case (by closing the valves provided therein) and opening the parallel branch, a connection can be established with each of the degassing zones VD1, VD2 provided via a connected branch with at least one plasma source.

If maintenance work is to be carried out at a plasma station or at a system in a branch, the operation can be maintained by connecting in the second degassing branch connected in parallel.

At the end, the two branches are connected to the separator/filter 4 via a connecting line 15b having a common discharge line, provided a separate filter is not provided in each branch.

As already mentioned, a cooling filter 3 and/or an ignition device 3' could also be connected upstream or in each branch separately.

It is thereby also shown, by means of FIG. 7, that the entire treatment of the waste gases flowing through can be improved and increased if two plasma stations are additionally connected in series in a corresponding branch 11b (shown in FIG. 7 by the right-hand branch 11b). This serial connection could, however, also be provided in both branches, in a departure from FIG. 7. Here too, corresponding single valves or double valves connected in parallel, as already discussed several times, are again connected at least upstream and/or downstream or preferably in each case upstream and or downstream of the individual components, such as, for example, the respective plasma source 2, the separator 4, etc. Corresponding single or double valves can also be connected upstream of the individual pumping stations. The same also applies to the line system Z2 which is additionally provided, which, coming from the input of the pumping station, produces a connecting line, for example, via switch valves M.1 to M.3 at least to one degassing line (for example degassing line 11b). The connection is made via a branched line arrangement, the connection points of which are in each case provided at connecting points 41.3 and 41.4 at the degassing line 11, which are each arranged downstream of the respective plasma source 2 in the flow direction.

The sequence of the method according to the systems will be described in greater detail hereinbelow.

In order to ensure in automatic operation that all the extruder waste gases are treated, the plasma source 2 should be used directly after the extruder 1 in the gas flow direction. When the vacuum system is started, the vacuum system including the plasma source 2 is evacuated. In order to avoid high pressure surges, the valves in the system according to the invention are of two-stage design. A bypass valve of reduced cross section (valves B.2 and F.2) is initially opened, until the adjacent lines have approximately the same pressure level, and then only the main valves are opened (valves B.1 and F.1). The use of a bypass with a pipe diameter of, for example, 15 mm allows slower equalisation of the pressure of the two adjacent volumes. Pronounced pressure surges, which would occur if the main valves having a diameter of, for example, 100 mm were opened suddenly, are thus avoided. When the extruder enters operation, the plasma source is ignited. The bypass valve A.2 is then opened for evacuation of the vacuum dome. If the pressure at the domes is approximately equal to the vacuum system pressure, the main valve A.1 opens.

In operation, the functioning of the plasma source 2 must be monitored in order to be able to respond to any failure. The devices of the plasma source or an additional system monitor(s) that the plasma is active. In order to ensure ignition, it can be necessary to use an additional ignition system 3'. This is to create ignition conditions in the plasma source 2. Additional vacuum lines which permit an independent pressure level in the plasma source compared to the remainder of the system are conceivable here (K.1-K.3 and M.1-M.3). If pre-ionisation of the gas in the plasma source is necessary, this can take place by a high voltage ignition or other auxiliary energy (for example ignition plug 23 in the gas stream upstream of the plasma source).

Excessive pressure or excessive temperature are considered to be shut-off conditions. These are monitored directly downstream of the plasma source. Excessive pressure at the plasma source can occur if there is a defect in the vacuum system, for example occurrence of a leak, incorrect supply of additional process gas, clogging of the filter or defective vacuum pumps. Elevated temperatures are likewise possible as a result of increased gas streams.

As soon as the pressure, for example, at the vacuum dome $p_1$ is far outside production-typical limit values (for example ≥30 mbar), the extruder is also shut down.

By connecting a plurality of plasma sources in series, the conversion of the waste gases flowing through can be increased further, or the sequence of the reactions can be influenced at any position upstream or downstream of a plasma source by adding additional gases (see reactants).

For degassing at the extruder, the pressure at the vacuum dome is critical. It can be specified as a method parameter. The process control system ensures sufficient throughput of the pumps and regulates the vacuum pressure at the desired value. The plasma source must be adapted to these ambient conditions, so that operation is ensured (for example adjustment of the tuners in the case of microwave plasma sources, mechanically or manually). Adjustment of the power of the energy introduced into the gas stream can be advantageous for the energy consumption of the system and for initiating specific reactions and should be present. The power requirement is also dependent on the gas stream and thus also on the output of the extruder and the state of the material to be processed.

The pressure at the vacuum dome (upstream of the filter $p_1$) and at the pump (downstream of the filter $p_2$) is determined as the control criterion for the method sequence.

In addition, it is important for automatic operation that the plasma source adapts independently to changed environment variables.

According to the invention, the tuner in the microwave system is adjusted automatically in dependence on the vacuum pressure. The pressure measurement value is transmitted to the plasma source by the PPS system.

The invention claimed is:

1. A device for degassing a polymer melt and for neutralising waste gasses formed thereby, the device comprising:
    a vacuum system configured to generate a low pressure or a vacuum that is 0 mbar to 100 mbar,
    a line and/or pipe system configured to feed the low pressure and/or vacuum to a degassing zone for degassing the polymer melt situated in the degassing zone,
    at least one filter and/or separator stage configured to remove or withdraw pollutants via the vacuum system from the degassing zone in the form of the waste gases or gaseous and/or liquid and/or solid components can be discharged;
    a first plasma source downstream of the degassing zone, wherein the first plasma source is configured to convert the pollutants removed from the degassing zone into a plasma state of aggregation;
    a first switch valve located upstream of the first plasma source, and a second switch valve located downstream of the first plasma source;
    a second plasma source downstream of the degassing zone, wherein the second plasma source is configured to convert the pollutants removed from the degassing zone into a plasma state of aggregation; and
    a third switch valve located upstream of the second plasma source, and a fourth switch valve located downstream of the second plasma source;
    wherein the first plasma source and the second plasma source are arranged in parallel with each other, and wherein the first plasma source and the second plasma source are configured to have different flow cross-sectional areas.

2. The device according to claim 1, wherein, upstream of the first or second plasma source in the flow direction of the waste gases, the device has a connection device for the feeding of process gases.

3. The device according to claim 2, wherein a pipeline or a container for the feeding of process gases comprising oxygen, nitrogen, carbon dioxide, argon, external air and/or water vapour, is connected upstream of the at least one connection for the feeding of process gases.

4. The device according to claim 1, wherein the first or second plasma source is configured such that the pollutants flowing through the first or second plasma source can be converted into the plasma state of aggregation by a supply of energy provided by thermal excitation, electromagnetic radiation, laser radiation, electrostatic fields, electromagnetic fields, alternating electrical fields, inductive excitation, and/or microwaves.

5. The device according to claim 1, wherein lines leading from the degassing zone to the first or second plasma source or pipes conveying the pollutants to the first or second plasma source are provided with thermal insulation and/or a heating device, via which the pipe system can be heated to at least 150° C.

6. The device according to claim 5, wherein the lines or pipes leading from the degassing zone to the first or second plasma source and through which the pollutants can flow are provided with and/or surrounded by a heating system for heating the pipes to a temperature range of from at least 150° C. to 300° C.

7. The device according to claim 1, wherein the first plasma source is connected in series with a third plasma source or the second plasma source is connected in series with a fourth plasma source.

8. The device according to claim 7, wherein at least one additional line branches from the line and/or pipe system between the degassing zone and the vacuum system, wherein the at least one additional line branches has a branching point between the first plasma source connected in series with the third plasma source or between the second plasma source connected in series with the fourth plasma source, and wherein the branching point is connected via at least one fifth switch valve to an intake and/or suction side of the vacuum system.

9. The device according to claim, 1, wherein an ignition device is connected upstream of the first or second plasma source.

10. The device according to claim 1, wherein one or more melt traps are provided in the line and/or pipe system, wherein the one or more melt traps are configured to prevent the penetration of melt from a plasticising unit into a vacuum unit.

11. The device according to claim 1, wherein a vortex nozzle or a waveguided nozzle is configured to feed process gases to the first or second plasma source.

12. The device according to claim 1, wherein the vacuum system comprises at least one vacuum pump, at least one Roots blower and/or at least one screw pump.

13. The device according to claim 1, wherein the first second, third, or fourth valve is in the form of a simple switch valve or in the form of double valves connected in parallel.

14. The device according to claim 1, wherein the device does not have a cold trap.

15. The device according to claim 1, wherein the first or second plasma source is in such a form that the pollutants fed to the first or second plasma source can be converted into the plasma state of aggregation to the extent of at least 20%.

16. The device according to claim 1, wherein the lines leading from the degassing zone to the first or second plasma source or the pipes conveying the pollutants to the first or second plasma source are provided with thermal insulation and/or a heating device, via which the pipe system can be heated to at least 200° C.

17. The device according to claim 5, wherein the lines or pipes leading from the degassing zone to the first or second plasma source and through which the pollutants can flow are provided with and/or surrounded by a heating system for heating the pipes to a temperature range of from at least 200° C. to 300° C.

18. The device according to claim 1, wherein the first or second plasma source is in such a form that the pollutants fed to the first or second plasma source can be converted into the plasma state of aggregation to the extent of at least 90%.

\* \* \* \* \*